United States Patent Office 2,763,693
Patented Sept. 18, 1956

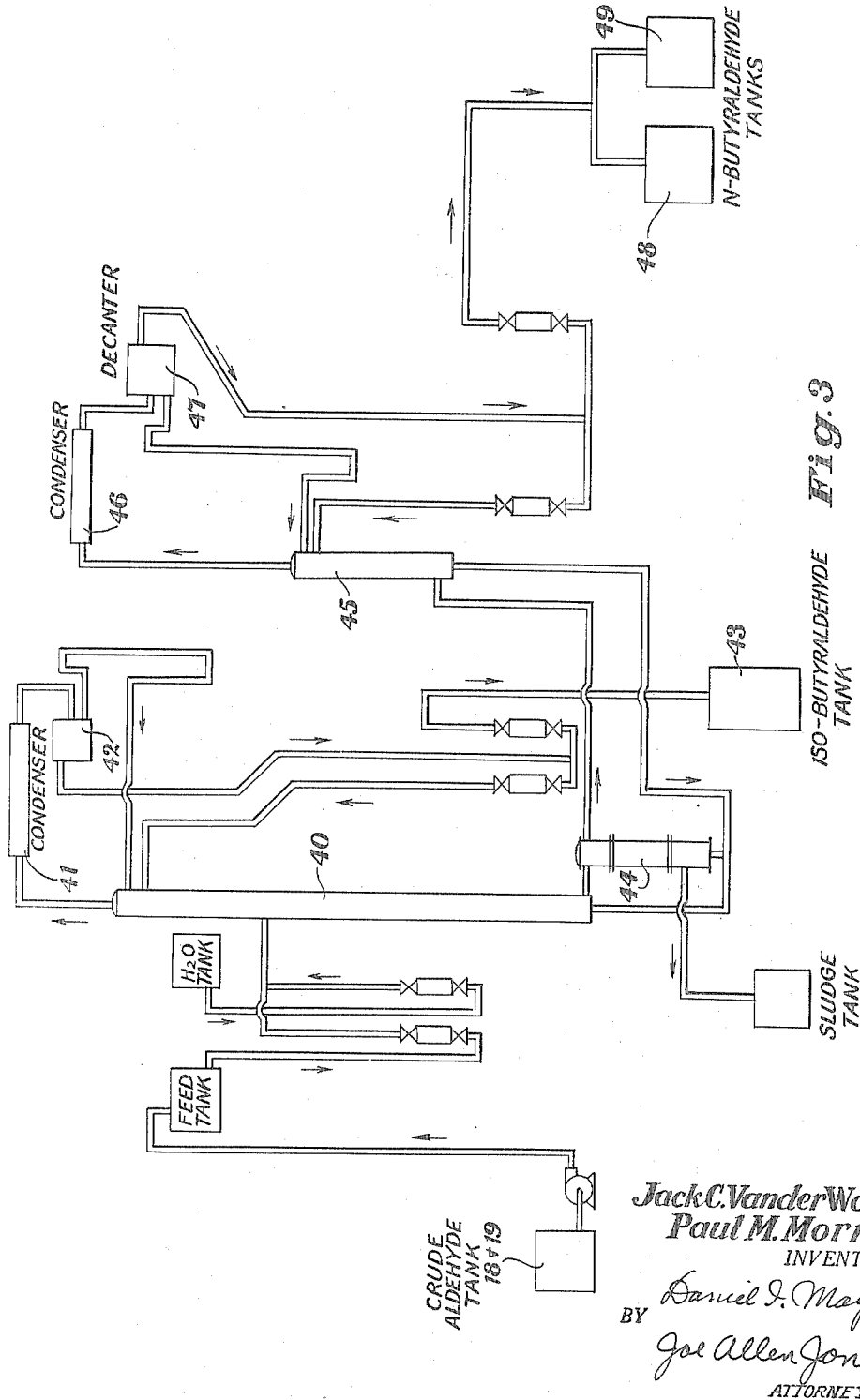

2,763,693

OXO PROCESS-SEPARATION AND RECOVERY OF PRODUCTS AND REACTION VEHICLE

Jack C. Vander Woude and Paul M. Morris, Longview, Tex., assignors to Eastman Kodak Company, Rochester, N. Y., a corporation of New Jersey Application October 13, 1951, Serial No. 251,218

7 Claims. (Cl. 260—604)

This invention is concerned with the separation and recovery of aldehydes formed by the oxonation of $C_2$–$C_6$ olefins employing a lower aliphatic alcohol as a reaction vehicle. It is further concerned with the separation of the aldehyde product and the recovery and reuse of the lower aliphatic alcohol as a reaction vehicle. In the present process the catalyst may be comprised of either a solution or a slurry of a metal carbonyl, or a metal carbonyl forming compound. We are particularly concerned with a process employing either a solution of a cobalt carbonyl compound in an alcohol, or a slurry of a reduced cobalt catalyst in an alcohol, or a combination thereof, the catalyst being conveniently deposited on an inert carrier, such as filter cel when a slurry is used.

The so-called Oxo process involves formation of lower aliphatic aldehydes by the reaction, under pressure, of $C_2$–$C_6$ olefins with carbon monoxide and hydrogen employing a solution and/or a suspension of a cobalt catalyst in a suitable reaction vehicle. In certain foreign work hydrocarbons were used as the medium (Roelen Patent 2,327,066), while co-workers of the applicants have found certain alcohols and ketones to give considerably better results. In addition to the desired aldehyde product, some aldehyde condensation products and acetal-type compounds are formed. To make the process economically feasible it was necessary to develop a suitable system for the separation and recovery of: (1) the aldehyde product, (2) the alcohol used as a reaction medium and (3) the high boilers. The latter consist essentially of acetal-type compounds, oils formed in the reactor and lubricating oil from the compressors.

Unless the various products of reaction and the alcohol reaction medium can be separated and recovered, the value of the process is greatly diminished, and until the present invention, considerable difficulty had been encountered by those working in this field in obtaining an economical balance between the purity of the products recovered, the amounts of compounds available for recycling, and the time and expense involved in the necessary separatory steps.

We have found that Oxo process reaction products and reaction vehicle can be recovered by separating the aldehyde from the alcohol reaction vehicle by distillation, then drying the separated reaction vehicle by distillation, separating the reaction vehicle from high boilers by distillation, and hydrolyzing the high boilers to convert acetal-type compounds and other high boiling compounds to aldehyde and alcohol. The hydrolysis column also acts as a flash column for recovery of aldehydes and alcohol from the water stream from scrubbers which remove these compounds from the vent gases from the reactor and distillation systems.

It is therefore an important object of our invention to provide a process and apparatus for the economical separation and recovery of reaction products and reaction medium or vehicle from the Oxo process.

Another object of the invention is to separate the products and reaction medium by separating the aldehyde from the reaction medium in an azeotropic distillation step, followed by separation of the reaction medium or vehicle from the high boilers by distillation. The high boilers are then hydrolyzed to convert acetal-type compounds to aldehyde and alcohols which may be recycled.

A further object of the invention resides in the novel arrangement whereby the column in which the acetals are hydrolyzed also functions as a flash column for recovery of aldehydes and alcohol from the water used in removing these compounds from the vent gases from the reactor and distillation systems.

Where the olefin used is ethylene, propionaldehyde is separated in the first distillation step and the performing of further steps on the aldehyde is unnecessary, but if the olefin used has from three to six carbon atoms it is necessary to subject the mixed aldehydes to a final purification, and it is a further object of the invention to provide such further purification steps and apparatus for carrying them out in combination with those already mentioned.

These and other objects of the invention will be apparent from a consideration of the following specification when read in conjunction with the accompanying drawings, in which:

Fig. 3 is a diagrammatic flow sheet showing a process and apparatus for separating the mixed aldehydes in tanks 18, 19 resulting from oxonation of an olefin higher than ethylene, for example propylene.

Figure 1:
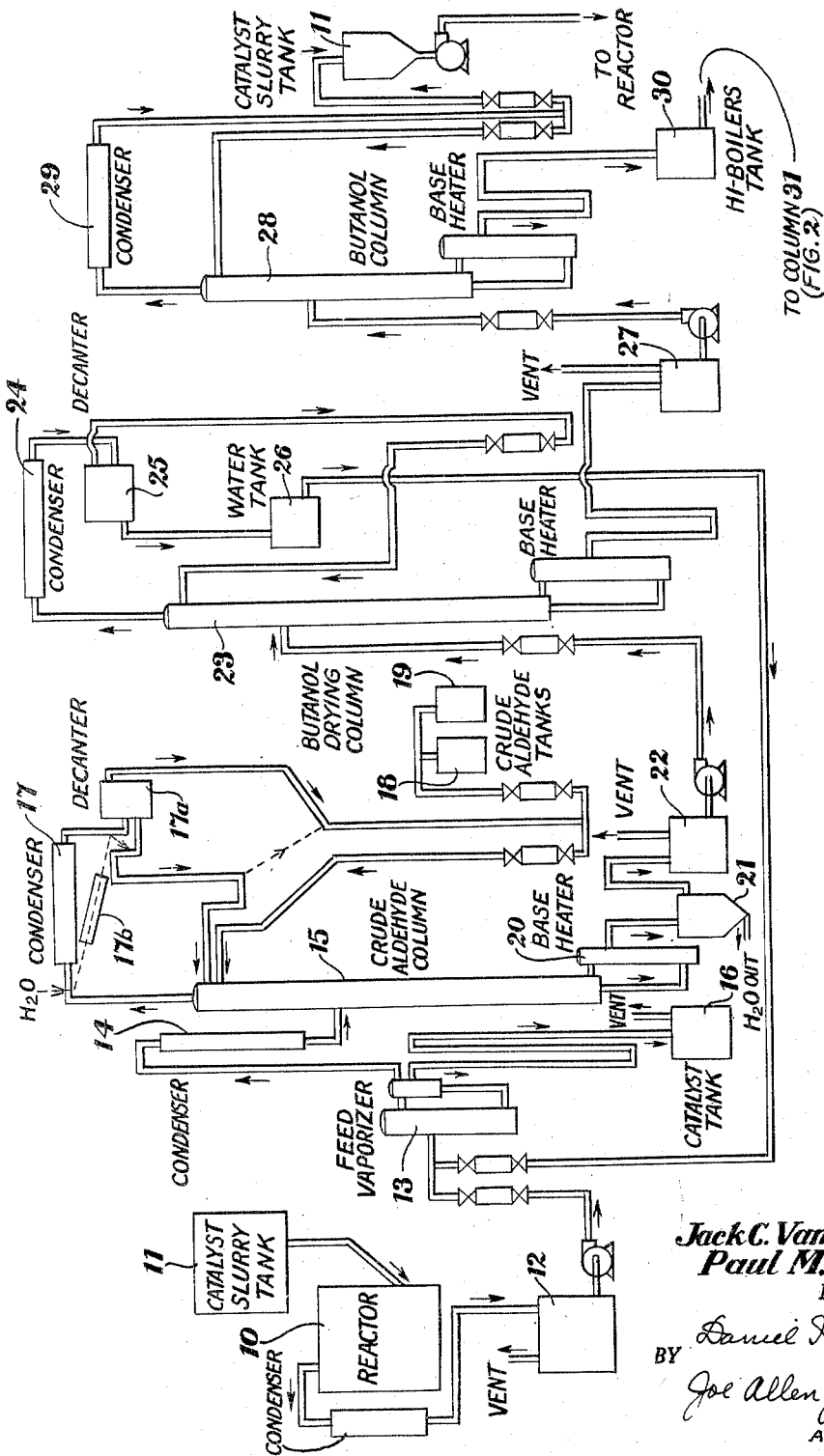
Fig. 1 is a diagrammatic flow sheet showing a process and apparatus whereby all of the invention is carried out except the final aldehyde separation and the treatment of high boilers. Dotted lines indicate modifications of the system for use with the products from oxonation of ethylene.

Referring now to Fig. 1, we will illustrate the invention first in connection with the oxonation of propylene to butyraldehydes using n-butanol as the reaction vehicle. We have shown a reactor 10 into which is fed carbon monoxide, hydrogen and olefin by any suitable arrangement known in the art. Catalyst is fed in a slurry from a slurry tank 11. Condensate from the reactor is bled off to tank 12, suitably vented, from which tank it is pumped to the feed vaporizer 13. Here the liquid product comprised of butyraldehydes, butanol, dipropyl ketones, butals and small amounts of high boilers, is flashed to separate most of the volatile components and all of the aldehyde and alcohol away from entrained catalyst. Vapors leaving vaporizer 13 at about 120–135° C. are condensed at 14 and fed at the 23d plate of a 45 plate column 15 while the catalyst slurry remaining is slurried continuously for return to the reactor space via tank 16, which is suitably vented, or for recovery and reactivation by extraction and/or reduction.

The crude aldehyde column 15 is used to separate the mixed azeotropes of normal and isobutyraldehydes from the alcohols, ketones and higher boiling materials. It is operated at a 2/1 reflux ratio with a feed temperature of 30–35° C., a head temperature of 59–65° C. and a base temperature of 90–96° C. The vapors are condensed at 17, a portion of the organic layer being decanted at 17a to storage tanks 18 and 19, while the remainder of the organic layer and the entire water layer are returned to the top of column 15 as reflux. The mixed aldehydes are saturated with water and are usually present in a normal to isobutyraldehyde ratio of 2/1, with a less than one per cent butanol. The bottoms from the aldehyde column 15 are overflowed continuously from the base heater 20 through a decanter 21 and then the organic layer passes to tank 22, the feed tank for the butanol drying column 23.

Butanol drying column 23 is used to dry the overflow from the aldehyde column, since the separation of alcohol and higher boiling materieals is greatly simplified if no water is present. This column can be operated to effect the addition of a controlled amount of water to the reactor space in recovered alcohol and other diluents, butals, etc., or to furnish dry butanol for extraction of spent catalyst. From tank 22 the feed goes into the drying column at the 29th plate of the 45 plate column. This column is operated at a base temperature of 120–135° C. and a head temperature of 88–95° C. Water is azeotroped out, condensed at 24 and decanted at 25. The water layer goes to tank 26 either for return to the aldehyde azeotropic still 15 or for removal from the system. The organic layer is totally refluxed and a mixture of dry butanol, butals, and other high boilers are overflowed continuously to tank 27, the feed tank for the butanol column 28.

Feed to the butanol column 28 is entered at the 20th plate of the 30 plate column, the base temperature of which is 150–175° C. Butanol vapors are taken off the top at 100–117° C., condensed at 29 and butanol is returned to the reactor space via the catalyst slurry tank 11. If desired, the distilled dry butanol can be used to extract spent catalyst by dissolving off solids which accumulate on the catalyst. The overflow from the base of the butanol column 28 goes to the high boiler tank 30.

Figure 2:
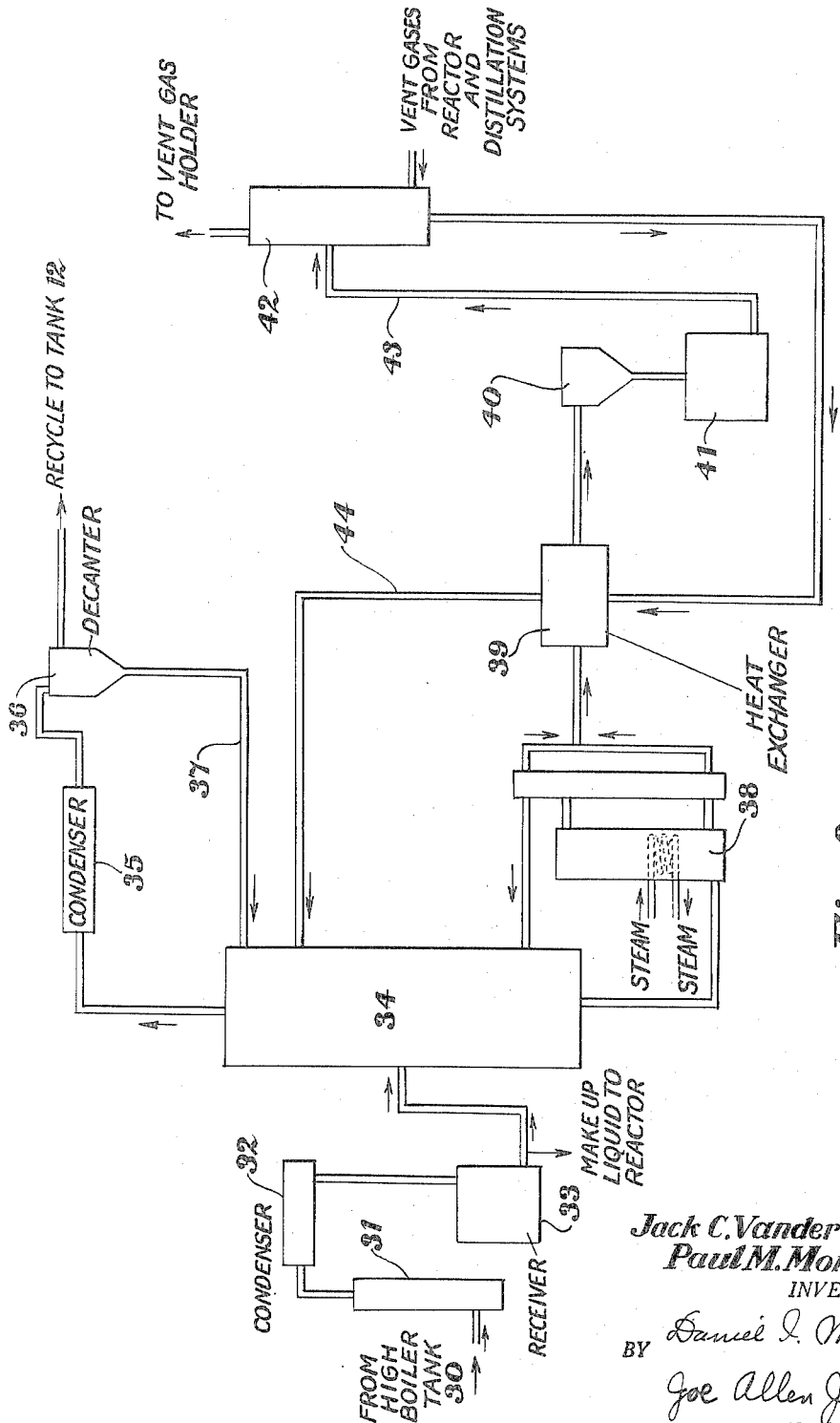
Fig. 2 is a continuation of Fig. 1 showing the treatment of high boilers from tank 30.

Turning now to Fig. 2, it is seen that from tank 30 the high boilers are fed to a five plate column 31 operated at reduced pressure to separate high boilers from entrained lubricating oils. This column is operated at a pressure varying from atmospheric down to approximately 1 mm., the pressure being decreased as the boiling point of the material left in the still increases, with the head temperature varying accordingly. The high boiling materials from tank 30 are distilled, for example in batches, from a reduced pressure five plate column 31 to separate high boilers from oil and catalyst. Using the batch method, when only oil and catalyst are left in the still this residue is removed for catalyst recovery and a new batch fed to the still.

The overhead product from still 31 is condensed at 32 and fed to receiver 33. Some of this material may be returned to the reactor as makeup liquid and the rest is passed to a 50 plate hydrolysis column 34 with water and a suitable hydrolysis agent such as 2–3% sulfuric acid to break down butyraldehyde dibutyl acetal for recovery of butyraldehyde and butanol which, together with some water, are taken off the top, condensed at 35, decanted at 36, and in part refluxed through line 37, while the remainder is returned to the system at the feed vaporizer 13 through tank 12. The water is reused in the hydrolysis or used in scrubbing vent gas or purge gas. Bottoms from column 34, which operates at a base temperature of 100–108° C., are overflowed continuously to base heater 38, pass through a heat exchanger 39, are decanted at 40, and pass to storage 41 from which water is fed to scrubber 42.

Vent gas from the various vents in the reactor and distillation systems (all of which vents have not been shown) is passed into the bottom of scrubber 42 and water from storage tank 41 is fed in at the top of the scrubber through line 43. The enriched water is removed at the bottom and pumped through heat exchanger 39 in out of contact heat exchange with hot liquid passing from the base heater 38 to decanter 40. The enriched water, thus warmed, then passes by line 44 to the hydrolysis column 34 from which the aldehydes and alcohol in the enriched water are recovered overhead at 80–95° C. as water azeotropes, the water being reused in hydrolysis and scrubbing. The scrubbed gas goes to a vent gas holder from which it may be reused in the reactor system as desired. In a manner similar to the use of scrubber 42, purge gas from the reactor system may be scrubber by water from storage 41 and then sent to a purge gas holder from which it is sent to boilers for recovery of its heat value. Thus, hydrolysis column 34 serves not only the hydrolysis function but also acts as a flash column for recovery of aldehyde and alcohol from the water stream from scrubber 42 and from a purge gas scrubber is such is used. Other suitable hydrolysis agents which may be used in the column in place of sulfuric acid are hydrochloric acid and phosphoric acid.

In the oxonation of propylene with carbon monoxide and hydrogen and employing isobutyl alcohol as the reaction medium, the same procedure is used.

Fig. 3 shows how final purification of the mixed aldehydes stored in tanks 18 and 19 is accomplished with 100 plate column 40. The mixed aldehydes are fed at the 55th plate along with sufficient water to azeotrope the aldehydes. The isobutyraldehyde column 40 is operated at a 17/1 reflux ratio and the isobutyraldehyde azeotrope is condensed at 41, fed to the decanter 42 and separated from the water layer which is returned to the top of the column, as is a portion of the organic layer. Isobutyraldehyde is stored at 43. The temperatures in column 40 are 59–61° C. at the head and 70–74° C. at the base.

Normal butyraldehyde flows to the base heater 44 where it is vaporized and passes to the n-butyraldehyde column 45 operated at a head temperature of 70–74° C. The butyraldehyde column is operated at a 1/1 reflux and the butyraldehyde azeotrope is condensed at 46, and fed to the decanter 47. The water layer is returned to the top of the column and the organic layer is sent to tanks 48 and 49 for storage.

The following example describes the use of the invention when propionaldehyde is produced. In the oxonation of ethylene with carbon monoxide and hydrogen to produce propionaldehyde the same distillation system shown in Figs. 1 and 2 is used with minor variations as will be explained. Propionaldehyde is distilled off in the crude aldehyde column and water is fed in before the condenser in an amount sufficient to suppress polymerization and/or condensation of the propionaldehyde. The dotted lines indicate the path followed by the propionaldehyde condensate, the condenser being shown at 17b.

The propionaldehyde does not form an azeotrope with water and it is therefore necessary to add the water desired to inhibit polymerization and/or condensation to the condensate leaving the column. Only the amount of water desired for this purpose is added, making the use of the decanter 17a unnecessary when propionaldehyde is produced.

The residual liquid from the aldehyde column 15 is overflowed continuously from the base heater 20 through decanter 21 to tank 22. Drying is accomplished by distilling off a mixture of butanol and diethyl ketone (formed in the reaction as a by-product of the aldehyde), a ternary azeotrope with water. As before, butanol and diethyl ketone are recovered in the butanol column. Separation of the recovered butanol and diethyl ketone is not required, the mixture being returned to the reactor space as before.

No additional purification of the propionaldehyde is required, so that the process and apparatus of Fig. 3 need not be used.

In place of n-butyl alcohol, isopropyl, normal propyl and isobutyl alcohols have been used with good results in the $C_2$–$C_6$ oxonation.

We have given illustrative examples of the application of the process and apparatus described above and illustrated in the drawings. These examples have been given in an illustrative sense and the invention is not to be considered as limited thereto, but is equally applicable to the separation of products and reaction vehicle from the oxonation of olefins having from two to six carbon atoms. The process and apparatus of the present invention overcome numerous difficulties previously unsolved by workers in this field, and by use of our invention, we achieve such a high degree of separation of reaction products and reaction medium or vehicle, that the Oxo process is rendered of high economic value and its great potentialities are realized.

We claim:

1. In a process of manufacturing aldehydes by the reaction of $C_2$ to $C_6$ olefins with carbon monoxide and hydrogen employing a cobalt catalyst in a lower aliphatic alcohol reaction vehicle, the steps of separating aldehyde from a mixture of alcohol reaction vehicle and high boilers by azeotropic distillation, drying the separated reaction vehicle by distillation, separating the reaction vehicle from high boilers by distillation, and subjecting the high boilers to hydrolysis to convert acetal-type compounds to aldehyde and alcohol.

2. A process according to claim 1, wherein the hydrolysis step is carried out in a distillation in which aldehyde and alcohol are distilled overhead.

3. A process according to claim 1, wherein the hydrolysis step is carried out in a distillation in which aldehydes and alcohol are distilled overhead, the bottoms from said hydrolysis distillation containing water, said water being used for scrubbing gases from the reactor and distillation systems to remove aldehyde and alcohol therefrom.

4. A process according to claim 3, wherein the water, after use in the scrubbing operation is returned to the hydrolysis distillation, aldehyde and alcohol therein being then recovered with the overhead from the hydrolysis distillation.

5. A process according to claim 4, wherein the bottoms from said hydrolysis distillation are passed in heat exchange relation with the water passing from said scrubbing operation to the hydrolysis distillation.

6. In a process of manufacturing aldehydes by the reaction of $C_2$ to $C_6$ olefins with carbon monoxide and hydrogen employing a cobalt catalyst in a lower aliphatic alcohol reaction vehicle, the steps of separating aldehydes and reaction vehicle from the high boilers by distillation, and then subjecting the high boilers to hydrolysis to convert acetal-type compounds therein to aldehyde and alcohol.

7. A process according to claim 1 wherein said hydrolysis step involves distillation in the presence of sulfuric acid, condensing of overhead from the hydrolysis distillation, and decanting of the condensate, the top decantation products consisting of aldehyde and alcohol being recycled to the first distillation step.

References Cited in the file of this patent

UNITED STATES PATENTS

| | | |
|---|---|---|
| 1,556,067 | Bogin | Oct. 6, 1925 |
| 1,724,761 | Holden | Aug. 13, 1929 |
| 2,315,139 | Stengel et al. | Mar. 30, 1943 |
| 2,500,329 | Steitz | Mar. 14, 1950 |
| 2,509,878 | Owen | May 30, 1950 |
| 2,564,200 | Grekel | Aug. 14, 1951 |
| 2,576,113 | Hagemeyer | Nov. 27, 1951 |
| 2,595,096 | Parker | Apr. 29, 1952 |
| 2,614,970 | Morrell et al. | Oct. 21, 1952 |